United States Patent [19]

Curnow

[11] Patent Number: 4,724,673
[45] Date of Patent: Feb. 16, 1988

[54] POWER TRANSMISSION

[75] Inventor: John W. Curnow, Utica, Mich.

[73] Assignee: Vickers, Incorporated, Troy, Mich.

[21] Appl. No.: 880,587

[22] Filed: Jun. 30, 1986

[51] Int. Cl.⁴ ............................................. F15B 11/08
[52] U.S. Cl. ........................................ 60/489; 60/445;
60/420; 91/461
[58] Field of Search ..................... 91/461, 468, 454;
60/445, 488, 489, 493, 420, 422

[56] References Cited

U.S. PATENT DOCUMENTS

| | | | |
|---|---|---|---|
| 4,189,920 | 2/1980 | Dezelan | 60/420 |
| 4,345,436 | 8/1982 | Johnson | 60/422 X |
| 4,425,759 | 1/1984 | Krusche | 60/420 |
| 4,475,422 | 10/1984 | Brieden | 91/461 |
| 4,481,770 | 11/1984 | Lohbauer et al. | 60/468 X |

Primary Examiner—A. Michael Chambers
Assistant Examiner—John C. Fox
Attorney, Agent, or Firm—Barnes, Kisselle, Raisch, Choate, Whittemore & Hulbert

[57] ABSTRACT

A hydraulic control system comprising a hydraulic actuator having opposed openings adapted to alternately function as inlets and outlets for moving the element of the actuator in opposite directions and a pump system with load sensing control for supplying fluid to said actuator. A meter-in valve is provided to which the fluid from the pump is supplied and a manual or electrohydraulic controller alternately supplies fluid at pilot pressure to the meter-in valve for controlling the flow therefrom to the actuator to control direction and displacement of movement of the meter-in valve and the direction and velocity of the actuator. A pair of lines extends from the meter-in valve to the respective openings of the actuator. A meter-out valve is associated with each line to the actuator for controlling flow out of the actuator. Each meter-out valve is operated by the pilot pressure from the controller. Provision is made for sensing the maximum load pressure in one of a series of valve systems controlling a plurality of actuators and applying the higher pressure to the load sensing pump system. In addition, combined hydrostat and load drop check valves are provided to provide the dual function of maintaining a predetermined pressure drop across the meter-in valve, independent of actual pressure, which will result in constant flow as well as provide the load drop check valve function of opening during flow from the meter-in valve and closing when the meter-in valve is in neutral for venting of the meter-in valve.

4 Claims, 6 Drawing Figures

POWER TRANSMISSION

This invention relates to power transmissions and particularly to hydraulic circuits for actuators such as are found on earth moving equipment including excavators.

BACKGROUND AND SUMMARY OF THE INVENTION

This invention relates to hydraulic systems for controlling a plurality of actuators such as hydraulic cylinders which are found, for example, in earth moving equipment such as excavators and cranes. In such a system, it is conventional to provide a pilot operated control valve for each actuator which is controlled by a manually operated controller or electro hydraulic controller through a pilot hydraulic circuit. The control valve functions to supply hydraulic fluid to the actuator to control the speed and direction of operation of the actuator. In addition, the control valve for each actuator controls the flow of hydraulic fluid out of the actuator. It is also common to provide counterbalance valves or fixed restrictions to control overrunning loads.

In U.S. Pat. Nos. 4,201,052 and 4,480,527, having a common assignee with the present application, there is disclosed and claimed a hydraulic system for accurately controlling the position and speed of operation of the actuators; which system is simple and easy to make and maintain; which system is unaffected by change of load pressure of various portions of the system or other actuators served by the same source; which system may not use flow from the pressure source in the case of overrunning loads on the actuators; wherein the control valves may be mounted adjacent the actuator for preventing loss of control of the load in case of malfunction in the hydraulic lines to the actuator; wherein the valves which control flow out of the actuator to control the velocity in the case of energy generating loads; wherein the valve that controls flow into the actuator controls the velocity in the case of energy absorbing loads, wherein the valve system for each actuator can be mounted on its respective actuator and incorporates means for preventing uncontrolled lowering of the load in case of pressure failure due to breaking of the lines to the actuator mounted valve system; wherein the timing of operation of the valve controlling flow into the actuator and out of the actuator can be designed to accommodate the specific nature of the particular load. In certain high inertial loads such as swing drives on an excavator which utilize rotary actuators, smooth stopping and starting of the load and accurate positioning of the load are very essential.

In such a system, provision is made for sensing the maximum load pressure in one of a series of valve systems controlling a plurality of actuators and applying the higher pressure to the load sensing pump system. In addition load drop check valves are provided preventing return flow to the meter-in valve when it is in neutral.

In German patent application No. DE34 13 866 A1 there is disclosed the use of a hydrostat upstream from a meter-in valve which measures the pressure differential across the meterin valve to maintain a predetermined pressure differential. A hydrostat is provided which operates independently for each directional valve. If more flow is demanded for a number of functions in a system than the pump is capable of producing, the higher pressure function hydrostat will open fully and that function's flow will decrease while the lower pressure function will maintain demanded flow.

Among the objectives of the present invention are to provide a system which includes predetermined pressure differential across the meter-in spool which is applied by feedback from maximum load sensing pressure so that if more flow is demanded by a number of functions in a system than the pump is capable of, the inlet pressure tends to fall off to the load sensing pressure and the flow to each operating function tends to decrease proportionally tending to maintain the flow distribution to all functions; which system utilizes fewer parts and which can be readily adapted to the aforementioned systems such as shown in U.S. Pat. Nos. 4,201,052, 4,407,122, 4,418,612 and 4,480,527 and 4,569,722.

In accordance with the invention, provision is made for sensing the maximum load pressure in one of a series of valve systems controlling a plurality of actuators and applying the higher pressure to the load sensing pump system. In addition, combined hydrostat and load drop check valves are provided to provide the dual function of maintaining a predetermined pressure drop across the meter-in valve, independent of actual pressure, which will result in constant flow as well as provide the load drop check valve function of opening during flow from the meter-in valve and closing when the meter-in valve is in neutral for venting of the meter-in valve.

DESCRIPTION

Figure 1:
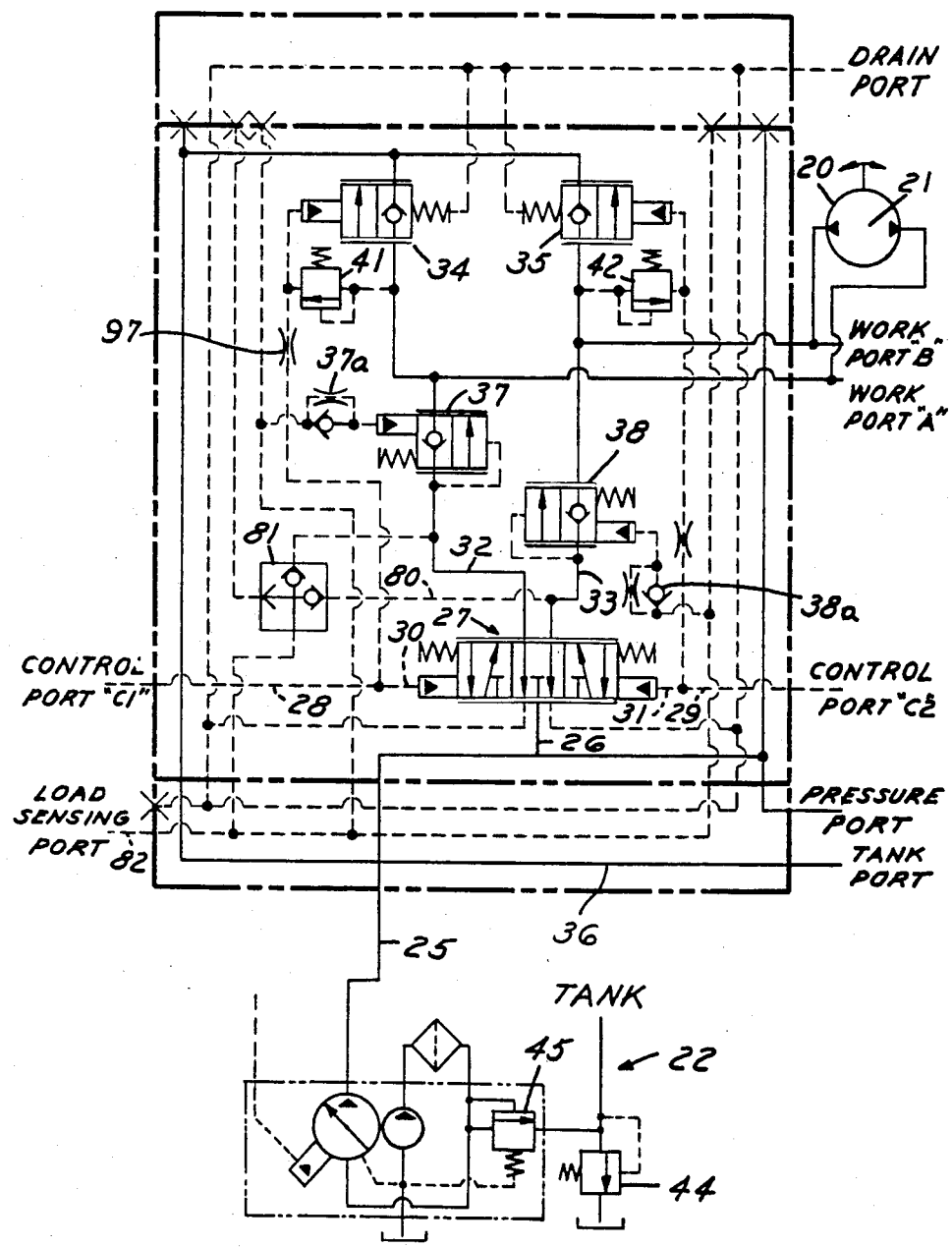
FIG. 1 is a schematic drawing of a hydraulic control system embodying the invention.
Figure 2:
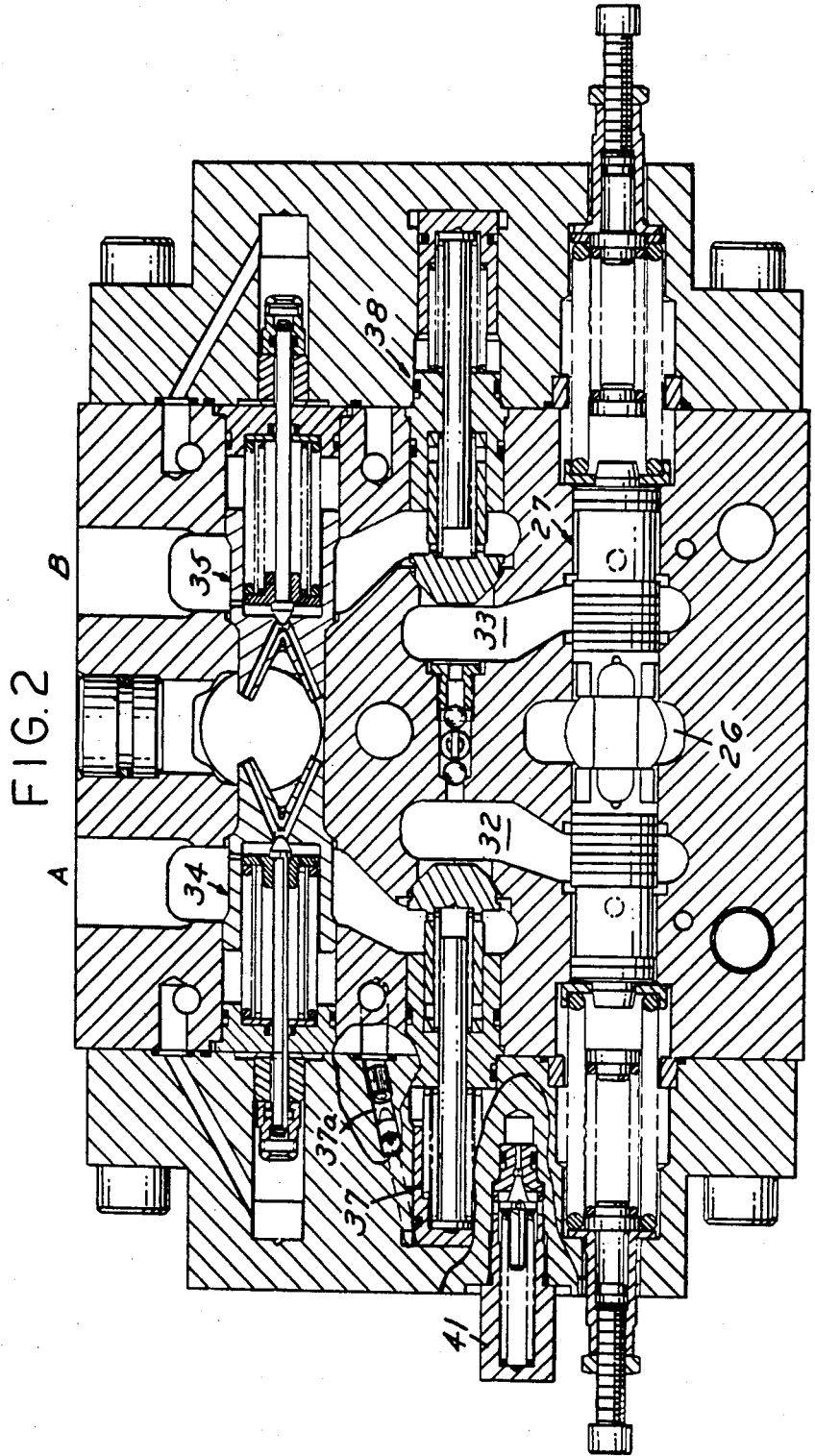
FIG. 2 is a partly diagrammatic sectional view of a hydraulic circuit shown in FIG. 1.

Referring to FIGS. 1 and 2, the hydraulic system embodying the invention is utilized with an actuator 20, herein shown as a rotary hydraulic cylinder, having an output shaft 21 supplied from a load sensing pump control system in accordance with conventional construction. The load sensing pump control system may comprise a variable displacement control system or a fixed displacement pump including a load sensing relief valve. The hydraulic system further includes a manual or electrohydraulic operated controller, not shown, that directs a pilot pressure through central ports C1, C2 to a valve system for controlling the direction of movement of the actuator, as presently described. Fluid from a pump 22 is directed through a pressure port to the line 25 and line 26 to a meter-in valve 27 that functions to direct and control the flow of hydraulic fluid to one or the other of the actuator ports A or B and to the actuator 20. The meter-in valve 27 is pilot pressure controlled by the controller, not shown, through lines 28, 29 and lines 30, 31 to the opposed ends thereof, as presently described. Depending upon the direction of movement of the valve, hydraulic fluid passes through lines 32, 33 to one or the other ports A or B of the actuator 20.

The hydraulic system further includes a meter-out valve 34, 35 associated with each end of the actuator in lines 32, 33 for controlling the flow of fluid from the end of the actuator to which hydraulic fluid is not flowing from the pump to a tank passage 36, as presently described.

The hydraulic system further includes combined hydrostat and load drop check valves 37, 38 in the lines 32, 33. Each valve 37, 38 may include an orifice and filter assembly 37a in the line that feeds the end of the valve 37, 38. The system may include spring-loaded anti-cavitation valves, not shown, which are adapted to open the lines 32, 33 to the tank passage 36. In addition, spring-loaded poppet valves 41, 42, are a part of each meter-out valve 34, 35 and act as pilot operated relief valves.

The system also includes a back pressure valve 44 associated with the return or tank line. Back pressure valve 44 functions to minimize cavitation when an overrunning or a lowering load tends to drive the actuator down. A charge pump relief valve 45 is provided to take excess flow above the inlet requirements of the pump 22 and apply it to the back pressure valve 44 to augment the fluid available to the actuator.

Meter-in valve 27 comprises a bore in which a spool is positioned and the absence of pilot pressure maintained in a neutral position by springs. The spool normally blocks the flow from the pressure passage 26 to the passages 32, 33. When pilot pressure is applied to either passage 30 or 31, the meter-in spool is moved in the direction of the pressure until a force balance exists among the pilot pressure, the spring load and the flow forces. The direction of movement determines which of the passages 32, 33 is provided with fluid under pressure from passage 26.

When pilot pressure is applied to either line 28 or 29, it is also applied to either meter-out valves 34 or 35, so that one of the valves is actuated to throttle flow from the associated end of actuator to tank passage 36.

It can thus be seen that the same pilot pressure which functions to determine the direction of opening of the meter-in valve also functions to determine and control the opening of the appropriate meter-out valve so that the fluid in the actuator can return to the tank line.

In the case of an energy absorbing load, when the controller is moved to operate the actuator in a predetermined direction, for example, by pilot pressure applied through line 28 and passage 30 moving the spool of the meter-in valve in a direction causing hydraulic fluid under pressure to flow through passage 33 opening valve 38 and continuing to the inlet B of the actuator. This same pilot pressure is applied to the meter-out valve 34 permitting the flow of fluid out of the end of the actuator 20 to the return or tank passage 36.

When the controller is moved to operate the actuator, for example, for an overrunning or lowering a load, the controller is moved so that pilot pressure is applied to the line 28. The meter-out valve 34 opens before the meter-in valve 27 under the influence of pilot pressure. The load on the actuator forces hydraulic fluid through the opening A of the actuator past the meter-out valve 34 to the return or tank passage 36. At the same time, the valve 35 is opened permitting return of some of the fluid to the other end of the actuator through opening B thereby avoiding cavitation. Thus, the fluid is supplied to the other end of the actuator without opening the meter-in valve 27 without utilizing fluid from the pump.

To achieve a float position, the controller is bypassed and pilot pressure is applied to both pilot pressure lines 28, 29. This is achieved, for example, by a circuit, not shown, which will apply the fluid from a pilot pump directly to lines 28, 29 causing both meter-out valves 34 and 35 to open and thereby permit both ends of the actuator to be connected to tank pressure. In this situation, the meter-out valves function in a manner permitting fluid to flow back and forth between opposed ends of the cylinder.

By varying the spring forces and the areas on the meter-in valve 27 and the meter-out valves 34, 35, the timing between these valves can be controlled. Thus, for example, if the timing is adjusted so that the meter-out valve leads the meter-in valve, the meter-in valve will control flow and speed in the case where the actuator is being driven. In such an arrangement with an overhauling load, the load-generated pressure will result in the meter-out valve controlling flow and speed. In such a situation, the anti-cavitation check valves will permit fluid to flow to the supply side of the actuator so that no pump flow is needed to fill the actuator in an overhauling load mode or condition.

Provision is made for sensing the maximum load pressure in one of a multiple of valve systems 24 controlling a plurality of actuators and applying that higher pressure to the load sensitive variable displacement pump 22. Each valve system includes a line 80 extending to a shuttle valve 81 that receives load pressure from an adjacent actuator through a line 82. Shuttle valve 80 senses which of the pressures is greater and shifts to apply the higher pressure to the pump 22. A line 83 extends from passage 32 to shuttle valve 81. Shuttle valve 81 senses which of the pressures is greater and shifts to apply the higher pressure to pump 22. Thus, each valve system in succession incorporates shuttle valves 81 which compare the load pressure therein with the load pressure of an adjacent valve system and transmit the higher pressure to the adjacent valve system in succession and finally apply the highest load pressure to pump 22.

The above described circuit is shown and described in the aforementioned U.S. Pat. Nos. 4,201,052 4,407,122, 4,418,612, 4,480,527 and 4,569,272. The single meter-in valve 27 may be replaced by two meter-in valves as described in the aforementioned application.

The details of the preferred construction of the elements of the hydraulic circuit are more specifically described in the aforementioned U.S. Pat. Nos. 4,201,052, 4,407,122, 4,418,612, 4,480,527 and 4,569,722 which are incorporated herein by reference.

The hydraulic system shown in FIGS. 1 and 2 differs from the mentioned patents in that a combined hydrostat-load drop check valve 37, 38 is provided in place of the load drop check valve of these prior patents.

Figure 6:
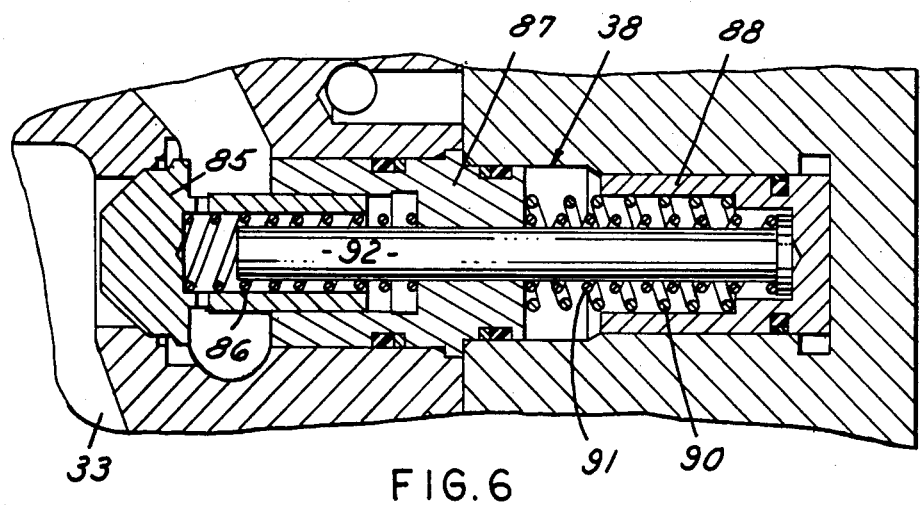
FIG. 6 is a fragmentary sectional view of the combined hydrostat and load drop check valve utilized in the systems.

Referring to FIG. 6, the combined hydrostat-load drop check valves 37, 38 perform the function of load drop check valves such as are shown and described in the aforementioned patents, and in addition, function to maintain a predetermined pressure drop across the associated meter-in valve.

As shown in FIGS. 6, the valve 37 and 38 comprises a poppet or check valve 85 that is yieldingly urged by a spring 86 into position obstructing flow in line 33 until the pressure therein exceeds a predetermined value as determined by the size of the spring. The spring 86 has the end thereof remote from the poppet 85 engaging a retainer 87 which it engages and is stationary in the body of the valve system. A pressure compensating piston 88 is yieldingly urged by spring 90 to the right as viewed in FIG. 6. A spring 91 urges a pin 92 to the right against piston 88. The fluid pressure in the load sensing port 82 is applied to the right of the piston 88.

The pressure sensing hydrostat shown and described maintains a predetermined pressure drop across the meter-in valve by feedback from the maximum load sensing pressure. Accordingly, as more flow is demanded by a number of functions in the system than the pump is capable of providing, the inlet pressure tends to fall off to the load sensing pressure and the flow of each operating function tends to decrease proportionally tending to maintain the flow distribution to all functions.

When only a single function is being performed, as in the single hydraulic system shown in FIG. 1, the spring opens the hydrostatic piston 88 wide open thereby reducing the pressure drop through the valve and reducing energy losses. This might occur, for example, when the the system is propelling a construction vehicle from one site to another.

Figure 3:
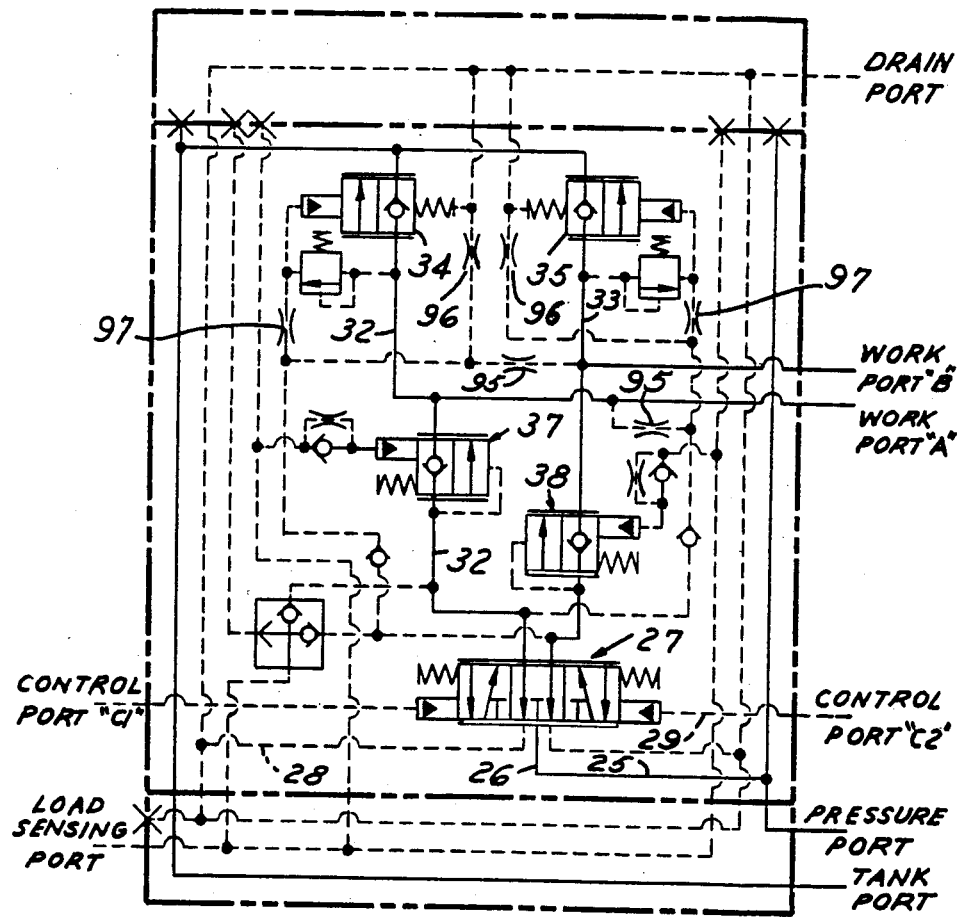
FIG. 3 is a schematic drawing of a modified form of hydraulic circuit embodying the invention.
Figure 4:
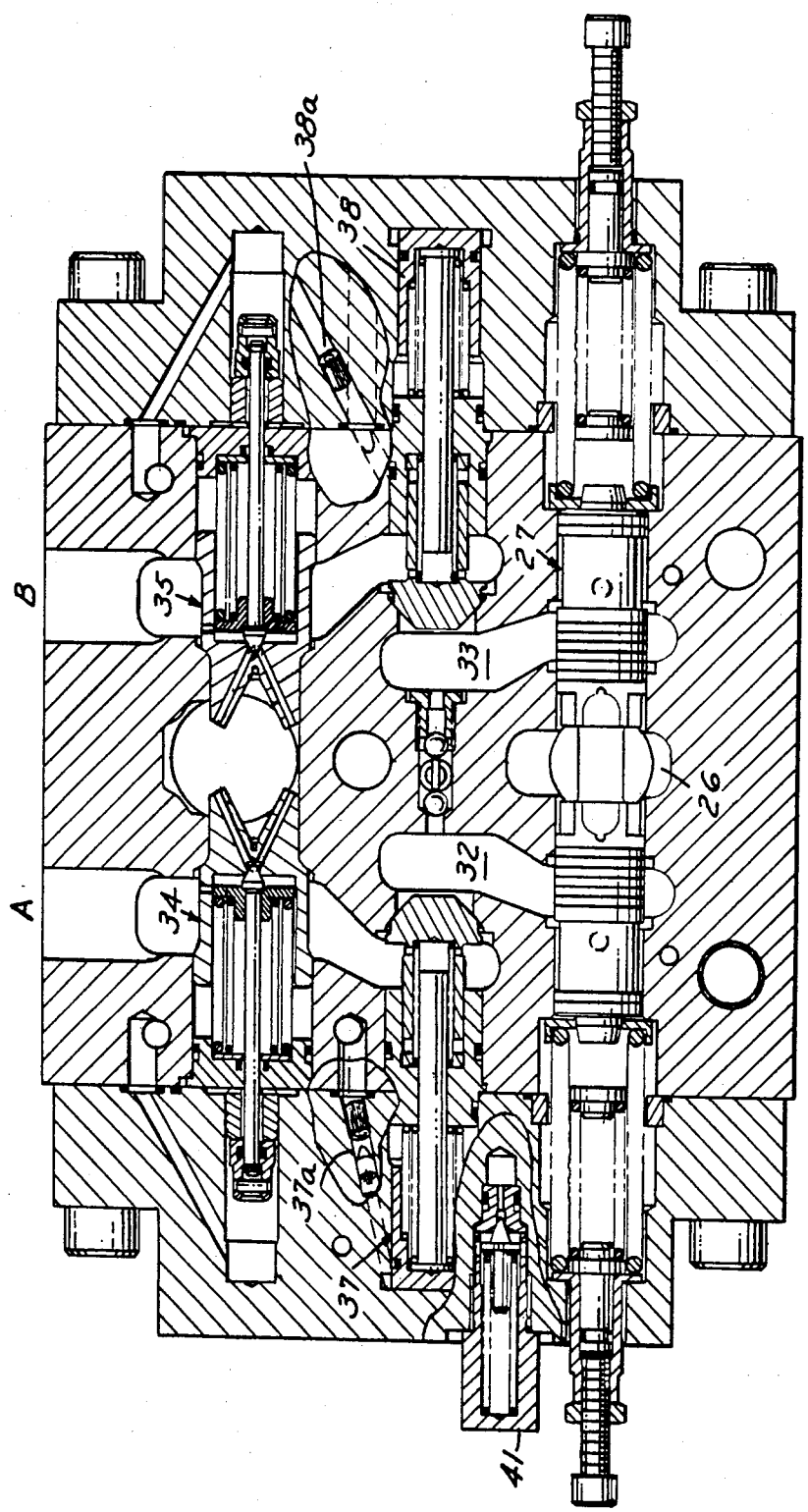
FIG. 4 is a partly diagrammatic sectional view of the hydraulic circuit shown in FIG. 3.

The hydraulic system set forth in FIGS. 3 and 4 is similar to that shown in FIGS. 1 and 2 except that it also is specifically adapted to a counterbalanced function and thus includes a restrictor 95 in the line to work port B together with restrictors 96, 97 in the manner more specifically shown and described in U.S. Pat. No. 4,569,272 which is incorporated herein by reference. The restrictors function to reduce the pressure tending to open the meter-out valve means associated with the other hydraulic line when the meter-in valve means is operated to supply pressure to said one hydraulic line.

Figure 5:
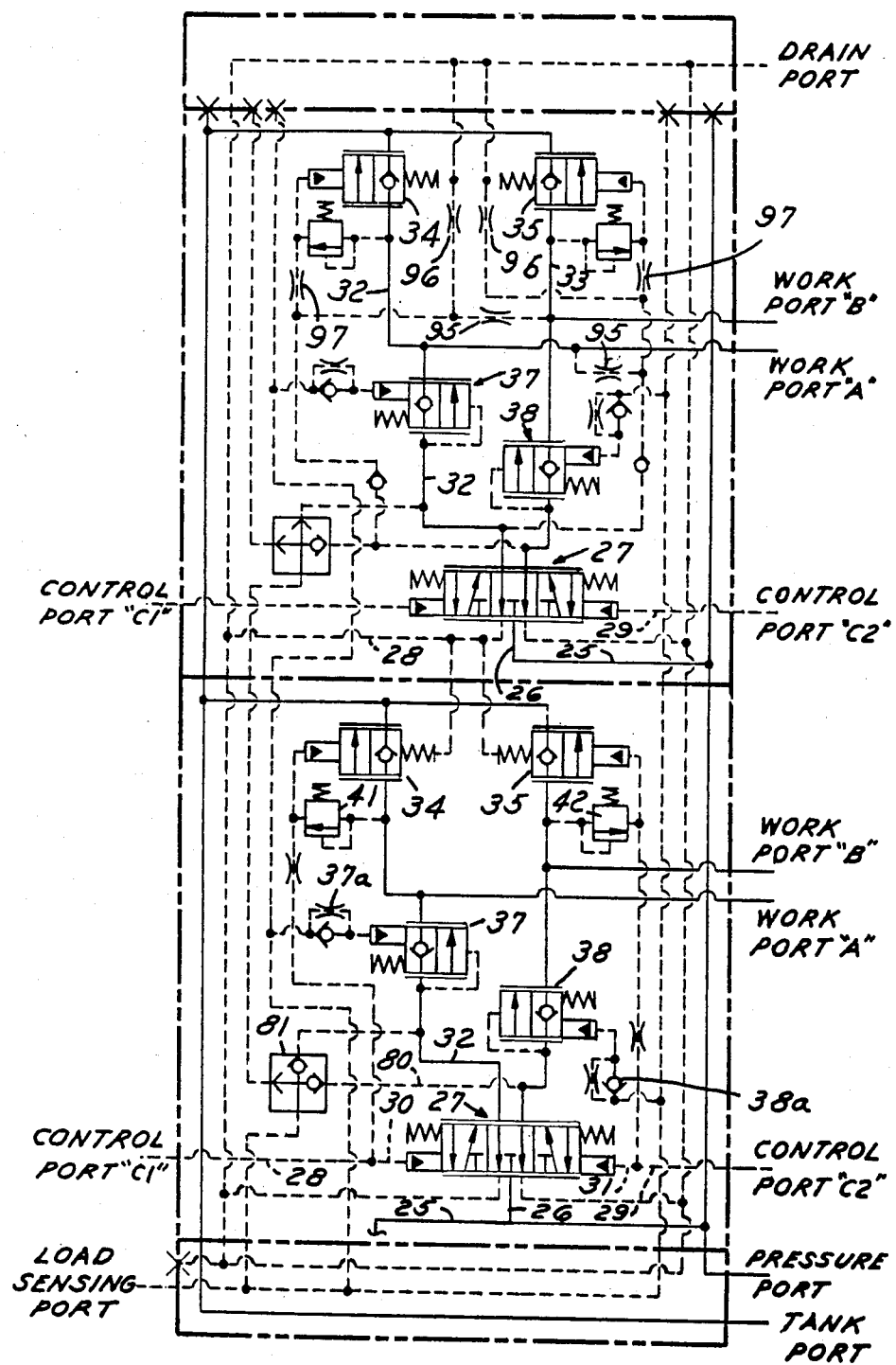
FIG. 5 is a schematic drawing of a hydraulic circuit embodying a plurality of circuits for controlling a plurality of actuators.

The manner in which one or more hydraulic systems can be combined is shown in FIG. 5 which is a schematic of a system such as shown in FIGS. 3 and 4 on the top of view FIG. 5 and a system such as shown in FIGS. 1 and 2 on the bottom of FIG. 5.

In the operation of a system such as shown in FIG. 5, the shuttle valve arrangement senses the highest load pressure and feeds it back to the pump control to establish a system pressure. The maximum load sensing pressure signal is applied behind the piston 88 of each system, which piston has an area approximately equal to the area of the seat of the check valve 85. This causes the load drop check valve 85 to function as a hydrostat and maintain constant pressure drop across the meter-in spool. If the pressures and areas were equal and the load drop check spring 86 would hold the check valve 85 closed it would never open. Accordingly the additional spring 90 has been added to oppose the load sensing feedback pressure.

What is claimed is:

1. For use in hydraulic control system comprising a hydraulic actuator having opposed openings adapted to alternatively function as inlets and outlets for moving the element of the actuator in opposite directions, and load sensing pump control for supplying fluid to said actuator,
   a meter-in valve to which the fluid from the pump is supplied,
   said valve being pilot controlled,
   a pair of lines extending from said meter-in valve to the respective openings of an actuator,
   a meter-out valve associated with at least one line to the actuator for controlling the flow out of said actuator,
   said meter-out valve being adapted to be pilot operated by the pilot pressure from a pilot controller,
   a combined normally open hydrostat and normally closed load drop check valve in at least one said line operable to permit fluid to flow from the meter-in valve to the actuator when the pressure exceeds a predetermined value and operable to maintain a predetermined pressure drop across the meter-in valve, independent of actual pressure so that a constant flow will be provided.

2. The hydraulic control system set forth in claim 1 including a second line extending from the meter-in valve to the other opening of said actuator, and a second combined normally open hydrostat and normally closed load drop check valve in said other line.

3. The hydraulic control system set forth in claim 1 including
   a second hydraulic control system comprising
   a meter-in valve to which the fluid from the pump is supplied,
   said valve being pilot controlled,
   a pair of lines extending from said meter-in valve to the respective openings of an actuator,
   a meter-out valve associated with each line to the actuator for controlling the flow out of said actuator,
   each said meter-out valve being adapted to be pilot operated by the pilot pressure from a pilot controller,
   a combined normally open hydrostat and normally closed load drop check valve associated with each of said lines of said second system,
   sensing means associated with a load sensing pump control system and said load sensing pump control system from the respective actuators of the two hydraulic control systems and operable to shift and apply the greater pressure to the pump to change the displacement of the pump.

4. The hydraulic control system set forth in claim 3 including a second line in the second hydraulic system extending from the meter-in valve to the other opening of said actuator, and a second combined normally open hydrostat and normally closed load drop check valve in said other line.

* * * * *